United States Patent
Nurcahya

(10) Patent No.: US 6,885,856 B2
(45) Date of Patent: Apr. 26, 2005

(54) TELEPHONE BRIDGING METHOD

(75) Inventor: Hadi Nurcahya, Sugarland, TX (US)

(73) Assignee: Chang-Sheng, Inc., Houston, TX (US)

( * ) Notice: Subject to any disclaimer, the term of this patent is extended or adjusted under 35 U.S.C. 154(b) by 383 days.

(21) Appl. No.: 10/044,200

(22) Filed: Jan. 10, 2002

(65) Prior Publication Data

US 2003/0129963 A1 Jul. 10, 2003

(51) Int. Cl.$^7$ .............................................. H04M 11/00
(52) U.S. Cl. .................. 455/405; 455/406; 379/114.21; 379/114.02; 379/114.1
(58) Field of Search ................................ 455/415–416, 455/417, 519; 379/88.19–88.21, 93.23, 142.01, 142.04, 142.05, 111, 112.01, 114.01, 114.02, 114.06, 114.1, 114.21, 115.01, 121.02, 127.01, 120

(56) References Cited

U.S. PATENT DOCUMENTS

| | | | | |
|---|---|---|---|---|
| 5,027,387 A | * | 6/1991 | Moll | ...................... 379/115.02 |
| 5,905,774 A | * | 5/1999 | Tatchell et al. | .......... 379/88.04 |
| 6,275,575 B1 | * | 8/2001 | Wu | ........................ 379/202.01 |
| 6,373,931 B1 | * | 4/2002 | Amin et al. | ........... 379/121.01 |
| 6,549,612 B1 | * | 4/2003 | Gifford et al. | ............. 379/67.1 |

* cited by examiner

Primary Examiner—Duc Nguyen
(74) Attorney, Agent, or Firm—Bracewell & Patterson, LLP; Jeffrey S. Whittle

(57) ABSTRACT

A method of reducing telephone usage charges billed by a telephone service provider for connecting a source telephone to a target telephone by communicating to a computer system the telephone number of the source telephone, and communicating to the computer system the telephone number of the target telephone, with the computer system originating a connection to the source telephone and originating a connection to the target telephone. The computer system then connects the source telephone to the target telephone. This connection is made such that a telephone service provider for the source telephone interprets the source telephone as a receiving telephone and bills the source telephone number at the discount rate for incoming calls for the telephone call. The computer system for this system may include a PBX system and computers capable of managing phone calls to and from the PBX system to accommodate both two party and multiple party calls.

21 Claims, 3 Drawing Sheets

TELEPHONE BRIDGING METHOD

BACKGROUND OF THE INVENTION

1. Field of the Invention

The present invention relates generally to methods for routing and controlling telephone calls. More specifically, the present invention relates to a method for initiating a telephone call from a phone to a computer and having a computer call the phone back and bridge the call to an intended recipient.

2. Description of the Related Art

Mobile and cellular telephones have existed for several years and have recently become very popular. Due to the popularity of these telephones competition has arisen between various service providers. As a result of this competition some providers have developed creative rate plans to attract customers. Most service providers charge a fee based on the number of minutes the telephone is connected to a call, similar to a long distance call. Variations in the number of prepaid minutes or certain time restrictions on when minutes may be used is common in the industry. In one common billing method, there is not any minutes charged for incoming calls, only for outgoing calls.

Various services are available that attempt to reduce the cost of long distance calls by determining the best rate available among several carriers. Such systems are not available for mobile and cellular telephones because only one service is available to the caller once the caller has signed a contract for telephone service.

It would be advantageous to develop a system to take advantage of rate differentials in plans that offer a lower rate for incoming calls.

BRIEF SUMMARY OF THE INVENTION

In accordance with embodiments of the present invention, a method for reducing telephone usage charges billed by a telephone service provider for a mobile or cellular telephone with a reduced rate service for incoming calls connected to a target telephone utilizes the Internet as a viable communications network via a computer system. The method comprises the steps of having the computer system call the sender telephone and the target telephone and then bridging the two connections. This allows both ends of the call to treat the call as an incoming call, using the computer as the sender. There are several variations on how this may occur. In one embodiment the caller dials from the sender or source telephone to a local computer system connection. After at least two rings the caller disconnects. The computer system uses an automated caller-ID system to determine the sender's call-back number and calls the sender. Once the sender is connected to the computer system the sender instructs the computer system to call the target number. This instruction can take many forms: the sender may dial the target number, the sender may dial a shortcut number pre-programmed into the computer system, or the caller may simply speak the name of the recipient utilizing voice recognition technology. The computer system then initiates a call to the recipient and connects the call. The computer then acts as the "bridge" connecting outgoing calls from the computer to both the "sender" and "receiver", with receiving a free, or lower rate, incoming call.

A variation includes the caller actually connecting with the computer system and communicating the target number on the first call. In this embodiment the computer system can then call the target receiver and the source simultaneously making for a smoother connection. In an additional variation the caller communicates with the computer system through a means other than a telephone call: a two way radio communication, a text message from using a two way pager system, an email message, point-and-click activation or any other means of communicating data to the computer system. Once receiving these instruction, the computer system completes the call to both parties.

A common feature of all of the embodiments is that both the sender and receiver telephone service provider recognizes the completed call as an incoming call. This provides substantial opportunities for cost savings on plans where incoming calls are billed at a lower rate than outgoing calls.

The computer system may comprise several computers linked in a network such as a local area network or LAN. One such system would use one computer to accept the incoming message, a second computer to initiate and connect the calls, and a third to control the process. For the computer system to connect to the telephone system it will need a PBX system. The type of PBX system used is dictated by the expected traffic to be handled by any one computer system.

The telephone bridging method of the present invention is believed to provide a simple method for taking advantage of differential rate plans. Specifically, the computer system treats the call in the most cost effective manner for a selected rate plan. Another example would be to use a computer as a local call recipient from the sender, wherein the computer completes a long-distance call over the Internet. Numerous uses of the computer "bridge" are contemplated to provide cost saving efficiencies over various rate plans utilized by cellular and mobile telephone service providers. The system is also useful for completing conference calls and the like, with each telephone unit on the conference call being treated as participating in a two-party call.

In an embodiment of the present invention, a method of reducing telephone usage charges by a telephone service provider includes communicating to an incoming call server of a computer system a source telephone number of a source telephone, the source telephone number having a telephone billing rate plan providing a discounted rate for incoming calls, and communicating to the computer system a target telephone number of a target telephone. The communication of the source telephone number can be accomplished by dialing a computer system telephone number for the computer system from the source telephone and disconnecting the source telephone after at least two rings of a ring sequence, an incoming call server of the computer system determining and recording the source telephone number of the source telephone from caller ID information embedded in a ring sequence of the telephone call from the source telephone. A call is then initiated from an outgoing call server of the computer system on a first telephone line to the source telephone, the outgoing server networked to the incoming call server. The communication of the target telephone number can be accomplished by providing the target telephone number to the outgoing server during the call back.

Upon receiving target data comprising a target telephone number, a call is also initiated from the outgoing call server of the computer system on a second telephone line to the target telephone. The source telephone on the first telephone line and the target telephone on the second telephone line are then connected via the outgoing server of the computer system to define a telephone call. This connection is made such that a source telephone service provider for the source telephone number and a target telephone service provider for the target telephone number each interpret the telephone call as an incoming call, the source telephone provider billing the source telephone number at the discount rate for incoming calls for the telephone call.

An embodiment of the present invention, a file server of the computer system, separate from the incoming call server, receives the target telephone data comprising the target telephone number. The outgoing call server, separate from and networked to the incoming call server and a file server, preferably through a local area network, receives the source telephone number from the incoming call server to initiate the incoming call back to the source telephone and receives the target telephone number from the file server during the call back to initiate the incoming call to the target telephone.

In an embodiment of the present invention, a plurality of target telephones are called on separate telephone lines. In this embodiment, the connection is made such that each target telephone service provider for each respective target telephone of the plurality of target telephones and the source telephone service provider for the source telephone interpret each telephone on the telephone call as participating in a two-party call, thereby negating any conference telephone call charges.

It is, therefore, and object and feature of the subject invention to provide an automated bridge network for connecting a plurality of telephones through a computer in such a manner that the telephones treat the call in the most cost effective manner.

It is also an object and feature of the subject invention to use a computer bridge between two telephones for connecting the telephones in a manner such that each telephone recognizes the connection as an incoming call.

It is a further object and feature of the subject invention to provide a bridge for connecting a plurality of telephones without the telephones communicating directly with one another over the public telecommunication system.

Other objects and features of the invention will be readily apparent from the accompanying drawings and detailed description of the preferred embodiments.

While the invention will be described in connection with the preferred embodiments, it will be understood that it is not intended to limit the invention to those embodiments. On the contrary, it is intended to cover all alternatives, modifications, and equivalents as may be included within the spirit and scope of the invention as defined by the appended claims.

DETAILED DESCRIPTION OF THE PREFERRED EMBODIMENTS

Figure 1:
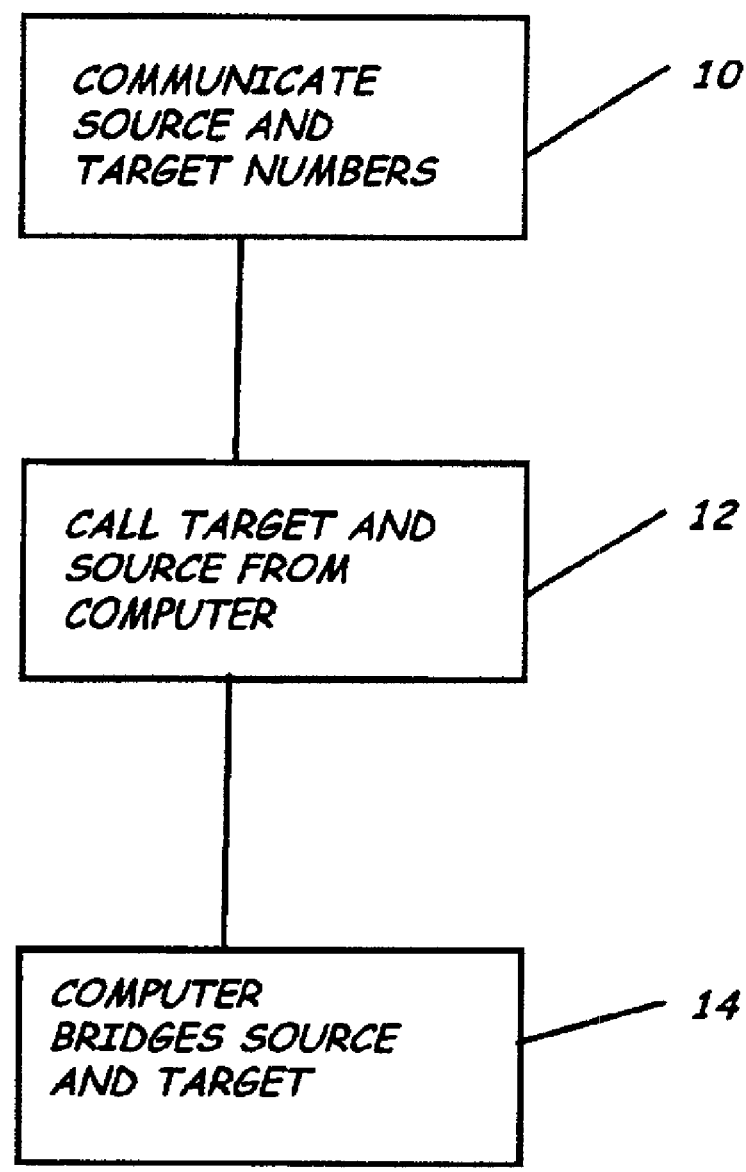
FIG. 1 is a flow chart of an embodiment of the telephone bridging method of the present invention.

Referring to FIG. 1, the most basic embodiment comprises the method of communicating a source or sending number and a target or receiving number to a computer system as shown at block 10, the computer system then dials or connects the target number and the source number on separate lines via the computer, as shown in block 12, and the computer system connects the separate lines as shown at block 14, thus bridging or completing the telephone call between the telephone addressed by the source number and the telephone addressed by the target number. In this manner, both telephones will recognize the call as an incoming call. Multiple target telephones can also be connected in this manner, whereby each telephone unit will treat the call as a two-party call between the telephone unit and the computer. There are numerous advantages to this system. In addition to redefining the bulk of any communication as an incoming call at both ends of the communication, the system will permit long distance calls to be made over the Internet and will both permit and provide a means for managing multi-party or conference calls.

The recipient or recipients of a call initiated by a source telephone will treat the telephone call as any incoming call. The source telephone will be able to selectively send the call to one or more local or long distance recipients in the most cost effective manner.

Figure 2:
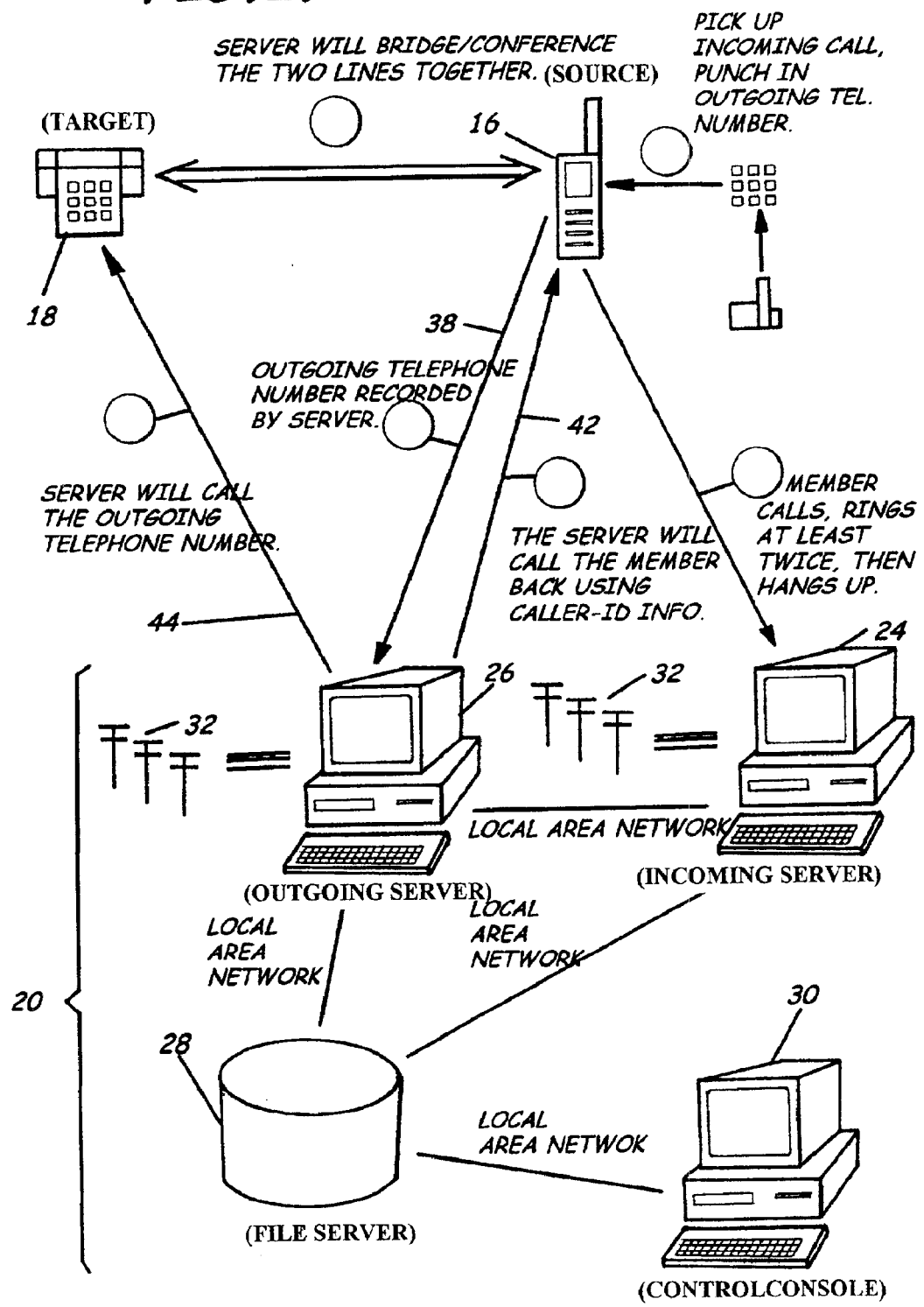
FIG. 2 is a schematic of another embodiment of the telephone bridging method of the present invention.

An expanded configuration is shown in FIG. 2. The source or sending telephone unit 16 is shown as a mobile phone. However, it should be recognized that the system and methods of the subject invention could be used with any source communication device. The target or receiving telephone unit 18 is shown as a generic telephone because for most applications it will not matter whether the target 18 is mobile or not. In this embodiment the computer system 20 is made up of multiple components, namely: the incoming call server 24, the outgoing call server 26, file server 28, control console 30 and PBX unit 32. Incoming call server 24 receives from calls over PBX 32 and sends data to file server 28 for instructing the outgoing call server 26 to initiate calls. Outgoing server 26 retrieves necessary information from file server 28 and initiates calls over PBX 32. Control console 30 provides access to all processes for trouble shooting and control purposes.

FIG. 2 also shows the interconnectivity relationship between the different components of the system of the subject invention.

Figure 3:
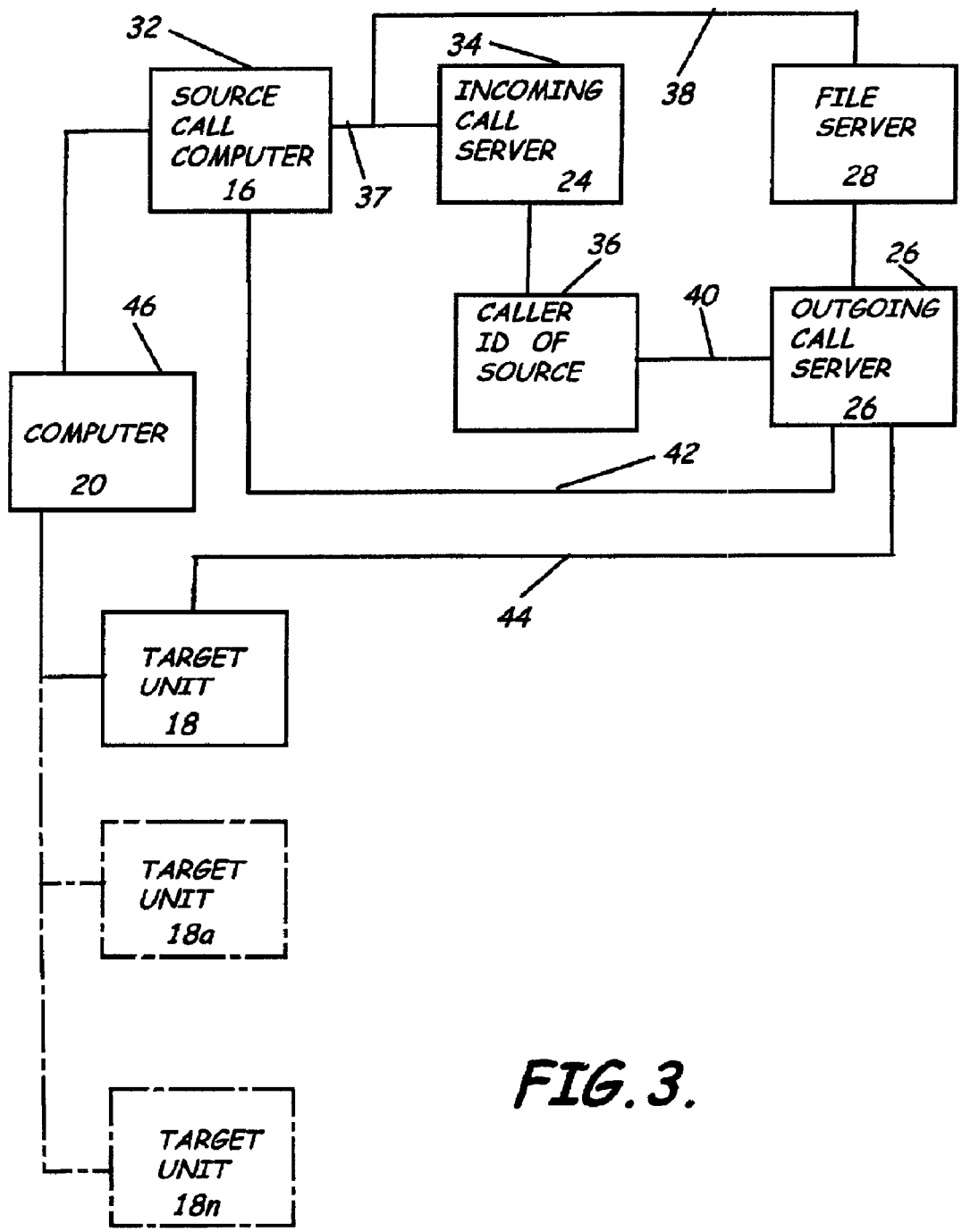
FIG. 3 is a flow chart of the embodiment of FIG. 2 of the telephone bridging method of the present invention.

FIG. 3 is an illustration of the chronological steps for completing a call in accordance the system in FIG. 2. Specifically, the system is initiated by a telephone call 32 from the sending or source unit 16 to incoming call server 24, as shown at 34. Standard caller ID technology may be used in the incoming call server to identify the sender, see 36. Typically, the incoming call server will permit the incoming call to go through two ring sequences since the caller ID data packet is embedded between the first and second ring sequence. This will permit the incoming call server 24 to identify and record the caller-ID information, typically providing the source unit call back number. The incoming call will also include target data identifying the receiving unit number. This can be in the form of verbal or tonal messages and is input as indicated at 38. The outgoing call server 26 uses the caller ID information at 40 to initiate a call at 42 to the source 16 likewise uses the target data to initiate a call to the receiving unit 18.

The caller can input the target data during the initial call or can wait until the computer calls back and input the target data at that time. The target data may comprise a call number or system stored data from file server 28. It may be in the form of a short cut or voice command or other format. Outgoing call server 26 receives this information and initiates a call as shown at 44 to the target unit 18. After placing the outgoing call to the target unit, the outgoing call server bridges (see 46) the target unit 18 to the source unit 16. This may be accomplished by using a standard call conferencing feature of PBX technology. Of course, multiple target units 18a–n may be connected in this manner to facilitate conference calls.

Also, the source unit 16 may connect to a local system 20 in this manner and the target may or may not be a local unit. Long distance calls may be connected using the system of the present invention and voice over IP technology to permit the Internet to be used as the carrier for the long distance call, eliminating long distance charges associated with common carriers.

The system of the subject invention permits telephone calls to be made from a source or sender unit to a target or multiple targets, wherein the source unit or billed unit configures the call in the most cost effective manner using a computer based support system to reconfigure the call into the intended setup. It is to be understood that the invention is not limited to the exact details of the construction, operation, exact materials or embodiment shown and described, as obvious modifications and equivalents will be apparent to one skilled in the art. For example, if a rate differential existed for incoming calls to a land line, the method would be equally effective. Accordingly, the invention is therefore to be limited only by the scope of the appended claims.

I claim:

1. A method of reducing telephone usage charges billed by a telephone service provider for connecting a source telephone to a target telephone, the method comprising the steps of:
   communicating from the source telephone to a computer system the source telephone number, the source telephone number having a telephone billing rate plan providing a discounted rate for incoming calls;
   communicating from the source telephone to the computer system a target telephone number of a target telephone;
   initiating an incoming call back to the source telephone from the computer system, having disconnected the source telephone from the computer system prior to initiating the incoming call to the source telephone;
   after receiving the target telephone number, initiating an incoming call to the target telephone from the computer system; and
   connecting the source telephone with the target telephone via the computer system to define a telephone call, the source telephone service provider interpreting the source telephone as a receiving telephone for purposes of the telephone call; and
   billing the source telephone number at the discount rate for incoming calls for the telephone call.

2. The method of claim 1, wherein the source telephone is a cellular telephone, and wherein no minutes are charged for incoming calls, only for outgoing calls.

3. The method of claim 1, wherein the source telephone is a mobile telephone, and wherein the target telephone number is communicated from the source telephone to the computer system during the call back.

4. The method of claim 1,
   wherein the step of communicating from the source telephone to the computer system a target telephone number of a target telephone includes communicating telephone numbers for a plurality of target telephones;
   wherein the step of connecting the source telephone with the target telephone includes connecting the plurality of target telephones with one another and the source telephone; and
   wherein each target telephone service provider for each of the respective target telephones and the source telephone service provider for the source telephone interpret their respective telephone on the telephone call as participating in a two-party call, thereby negating any conference telephone call charges.

5. The method of claim 1,
   wherein the step of communicating from the source telephone to a computer system the source telephone number includes the steps of:
      dialing a computer system telephone number for the computer system from the source telephone,
      disconnecting the source telephone after at least two rings of a ring sequence, and
      the computer system determining the source telephone number of the source telephone from caller ID information embedded in a ring sequence of the telephone call from the source telephone;
   wherein the step of initiating a call from the computer system to the source telephone comprises the step of the computer system calling back the source telephone using the determined source telephone number; and
   wherein the target telephone number is communicated from the source telephone to the computer system during the call back.

6. The method of claim 1, wherein the source and the target telephone communicate directly through the computer system.

7. The method of claim 1, further comprising the step of eliminating long distance charges associated with common carriers by connecting a long distance telephone call between the source telephone with the target telephone using voice over internet protocol (IP) technology, the internet being used as a carrier.

8. The method of claim 1, wherein the target telephone information comprises a computer address for stored information.

9. The method of claim 1,
   wherein an incoming call server of the computer system identifies and records the source telephone telephone number; and
   wherein a file server, separate from the incoming call server, receives target telephone data comprising the target telephone number.

10. The method of claim 9 wherein
    an outgoing call server, separate from and networked to the incoming call server and the file server, receives the source telephone number from the incoming call server to initiate the incoming call back to the source telephone and receives the target telephone number from the file server to initiate the incoming call to the target telephone.

11. The method of claim 10,
    wherein the step of communicating from the source telephone to the computer system a target telephone number of a target telephone includes information for a plurality of target telephones; and
    wherein the step of connecting the source telephone with the target telephone includes connecting the plurality of target telephones with one another and the source telephone.

12. The method of claim 10, wherein the incoming call server, file server, and outgoing call server are connected through a local area network.

13. A method for connecting a source mobile telephone having a discounted billing rate for incoming calls by a telephone service provider to a target telephone, the method comprising:
   initiating a call from the source mobile telephone to a computer system;
   indicating to the computer system the telephone number of the source telephone, the source telephone number having a lower billing rate for incoming calls than for outgoing calls such that no minutes are charged for incoming calls, only for outgoing calls;
   disconnecting the call to the computer system;
   after disconnecting from the source mobile telephone, the computer system initiating a call back from the computer system to the source mobile telephone;
   during the call back, the source mobile telephone indicating to the computer system the telephone number of the target telephone;
   after receiving the target telephone number, the computer system initiating a call from the computer system to the target telephone on a separate telephone line from that of the source telephone;
   the computer system conferencing the source mobile telephone and the target telephone, bridging the source and the target telephone lines, to define a telephone call, the telephone service provider interpreting the source mobile telephone as a receiving telephone for purposes of the telephone call; and
   billing the source mobile telephone number at the billing rate for incoming calls for the telephone call.

14. A method for completing a call between a source telephone and a target telephone comprising the steps:
   instructing a computer system to connect to the source telephone having a source telephone number, the source telephone number having a telephone billing rate plan providing a discounted rate for incoming calls;
   instructing the computer system to connect to the target telephone on a separate telephone line;
   instructing the computer system to bridge the source telephone to the target telephone to define a telephone call, each respective telephone service provider for the source telephone number and the target telephone number interpreting the telephone call as an incoming call; and
   billing at least the source telephone number at the discounted billing rate for incoming calls for the telephone call.

15. The method of claim 14, wherein the source telephone is a cellular telephone, and wherein no minutes are charged for incoming calls, only for outgoing calls.

16. A method of reducing telephone usage charges by a telephone service provider for connecting a source telephone to a target telephone, the method comprising the steps of:
   communicating to an incoming call server of a computer system a source telephone number of a source telephone, the source telephone number having a telephone billing rate plan providing a discounted rate for incoming calls;
   communicating to the computer system a target telephone number of a target telephone;
   initiating a call back from an outgoing call server of the computer system on a first telephone line to the source telephone, the outgoing server separate from and networked to the incoming call server;
   after receiving target data comprising a target telephone number, initiating a call from the outgoing call server on a second telephone line to the target telephone;
   connecting the source telephone on the first telephone line with the target telephone on the second telephone line via the outgoing server of the computer system to define a telephone call, a source telephone service provider for the source telephone number and a target telephone service provider for the target telephone number each interpreting the telephone call as an incoming call; and
   based on the interpretation, the source telephone provider billing the source telephone number at the discount rate for incoming calls for the telephone call.

17. The method of claim 16,
   wherein the step of communicating to an incoming call server of a computer system a source telephone number of a source telephone includes the steps of:
      dialing a telephone number associated with the incoming file server of the computer system from the source telephone,
      disconnecting the source telephone after at least two rings of a ring sequence, and
      the incoming call server determining the source telephone number of the source telephone from caller ID information embedded in a ring sequence of the telephone call from the source telephone;
   wherein the step of initiating a call back from the computer system to the source telephone comprises the step of the outgoing call server of the computer system calling the source telephone using the determined source telephone number; and
   wherein the step of communicating to the computer system a target telephone number of a target telephone includes providing the target telephone number to the computer system during the call back.

18. The method of claim 17,
   wherein the incoming call server of the computer system identifies and records the source telephone telephone number; and
   wherein a file server of the computer system, separate from the incoming call server, receives the target telephone data comprising the target telephone number.

19. The method of claim 18, wherein the outgoing call server, separate from and networked to the incoming call server and the file server, receives the source telephone number from the incoming call server to initiate the incoming call back to the source telephone and receives the target telephone number from the file server during the call back to initiate the incoming call to the target telephone.

20. The method of claim 19, wherein the incoming call server, file server, and outgoing call server are connected through a local area network.

21. The method of claim 16,
   wherein the step of communicating from the source telephone to the computer system a target telephone number of a target telephone includes communicating telephone numbers for a plurality of target telephones;

wherein the step of connecting the source telephone with the target telephone includes connecting the plurality of target telephones, each connected to separate telephone lines, with one another and the source telephone line via the outgoing server; and wherein each target telephone service provider for each of the respective target telephones and the source telephone service provider for the source telephone interpret their respective telephone on the telephone call as participating in a two-party call, thereby negating any conference telephone call charges.

* * * * *